Oct. 3, 1961  F. C. MOCK  3,002,338
FUEL CONTROL APPARATUS
Filed March 26, 1956  7 Sheets-Sheet 1

INVENTOR.
FRANK C. MOCK.
BY
P. L. Brodahl
ATTORNEY.

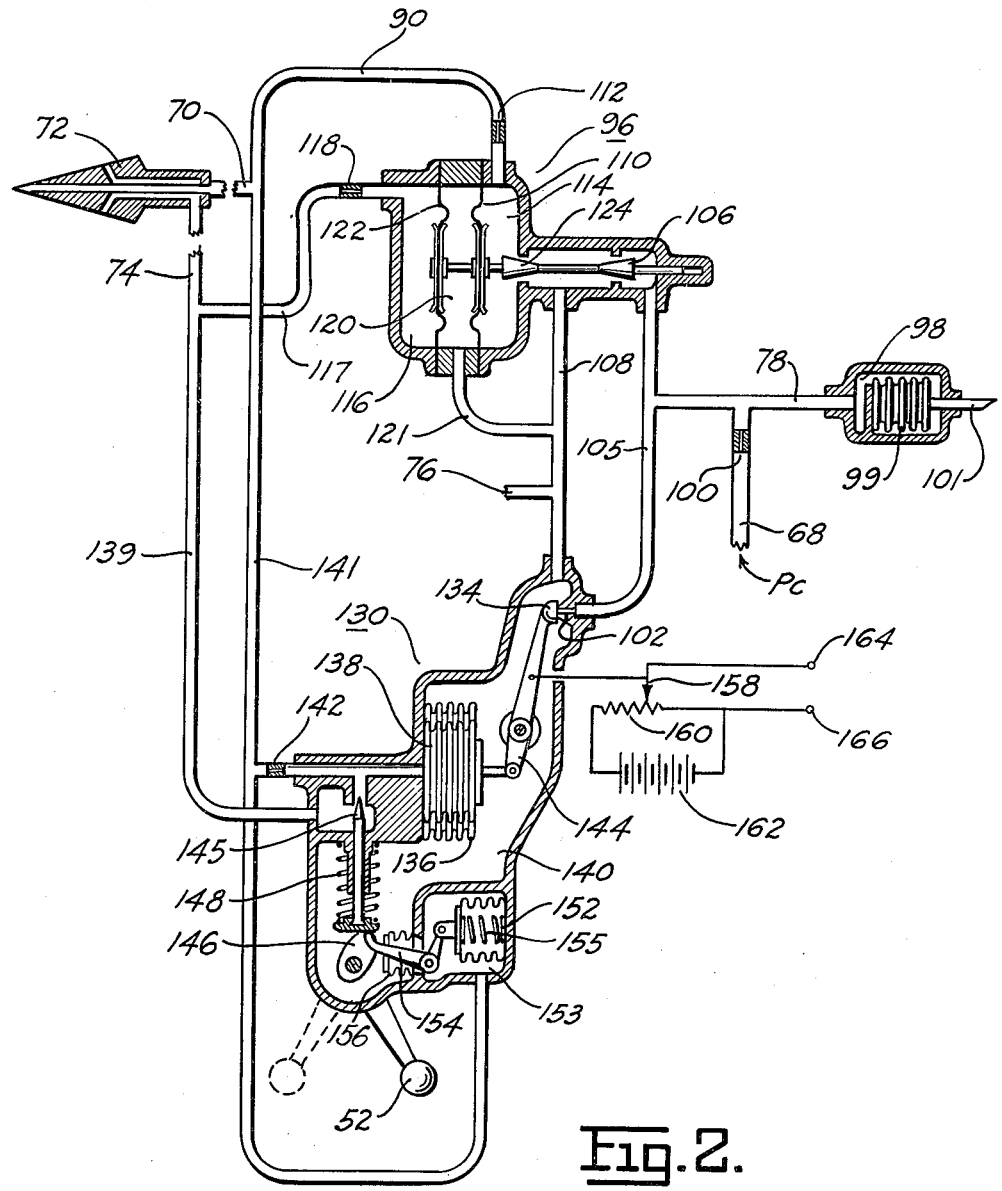

Oct. 3, 1961  F. C. MOCK  3,002,338
FUEL CONTROL APPARATUS
Filed March 26, 1956  7 Sheets-Sheet 3

INVENTOR.
FRANK C. MOCK.
BY
P.J.Brodahl
ATTORNEY.

Oct. 3, 1961  F. C. MOCK  3,002,338
FUEL CONTROL APPARATUS
Filed March 26, 1956   7 Sheets-Sheet 4
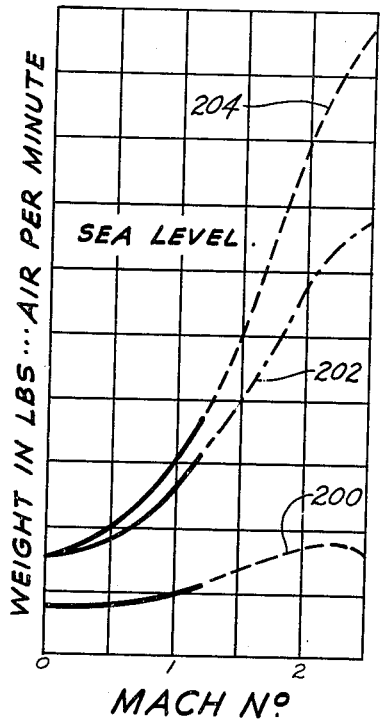
Fig.4A.
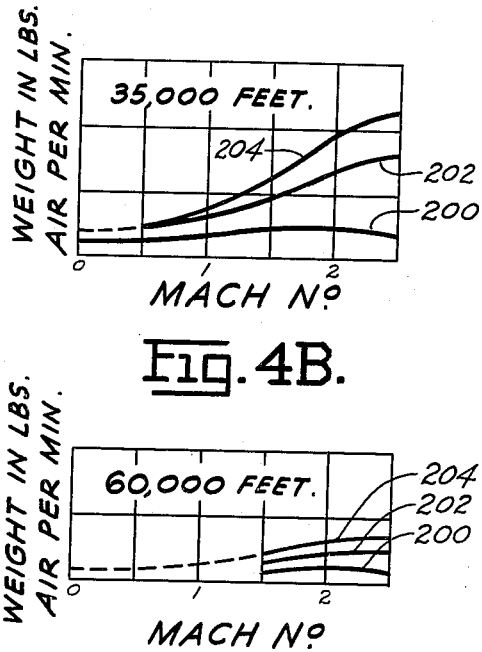
Fig.4B.
Fig.4C.
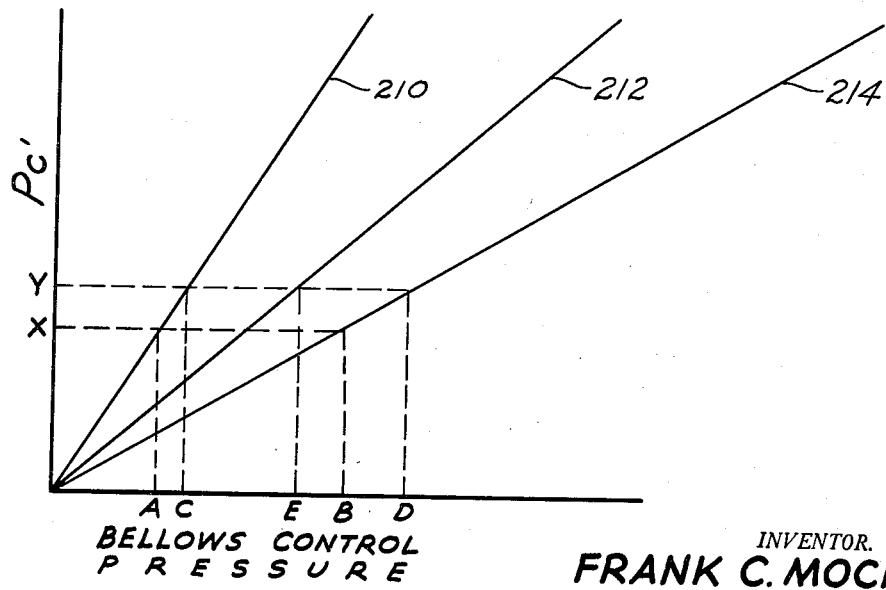
Fig.7.
INVENTOR.
FRANK C. MOCK.
BY
ATTORNEY

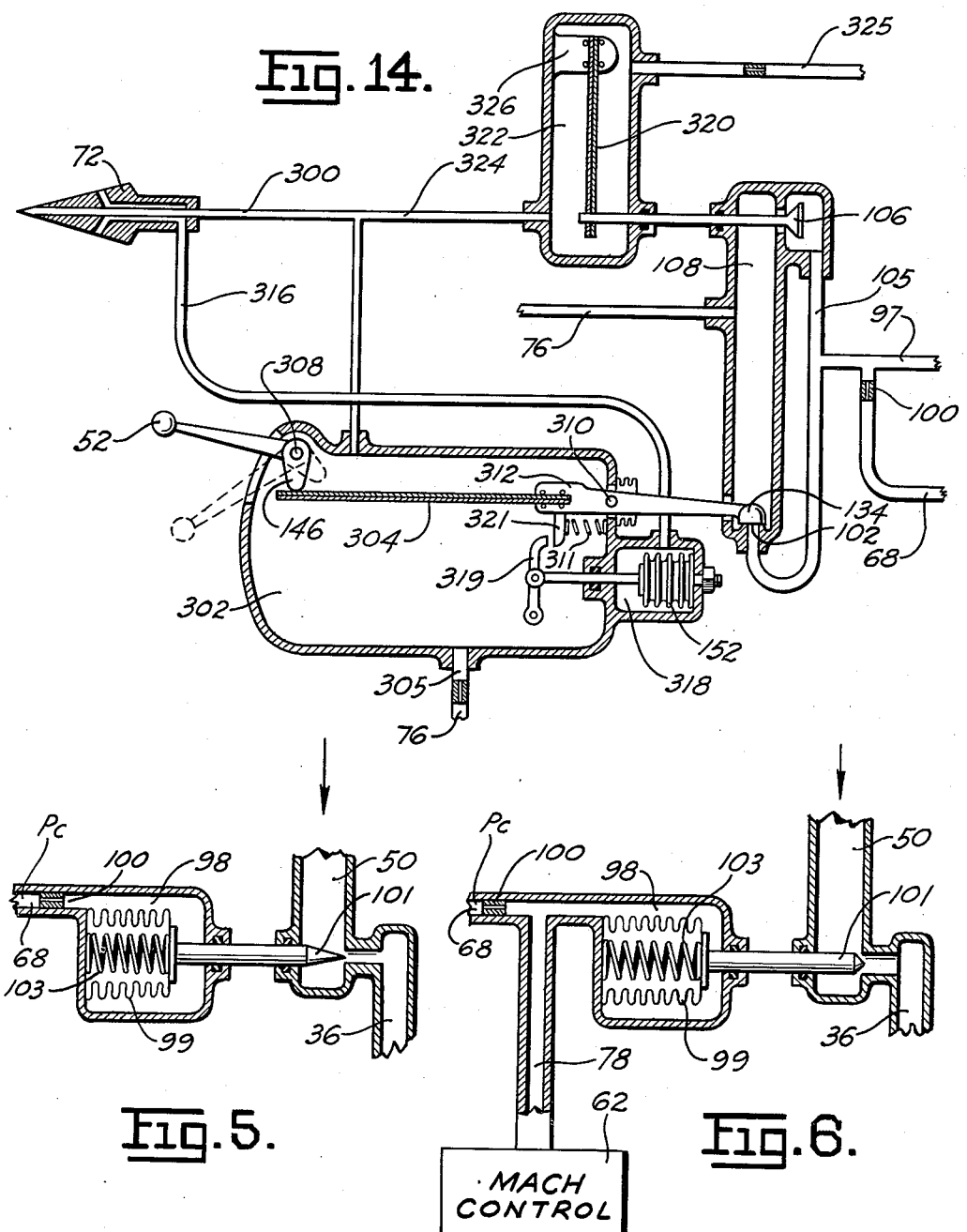

Oct. 3, 1961  F. C. MOCK  3,002,338
FUEL CONTROL APPARATUS
Filed March 26, 1956  7 Sheets-Sheet 6

INVENTOR.
FRANK C. MOCK.
BY
ATTORNEY

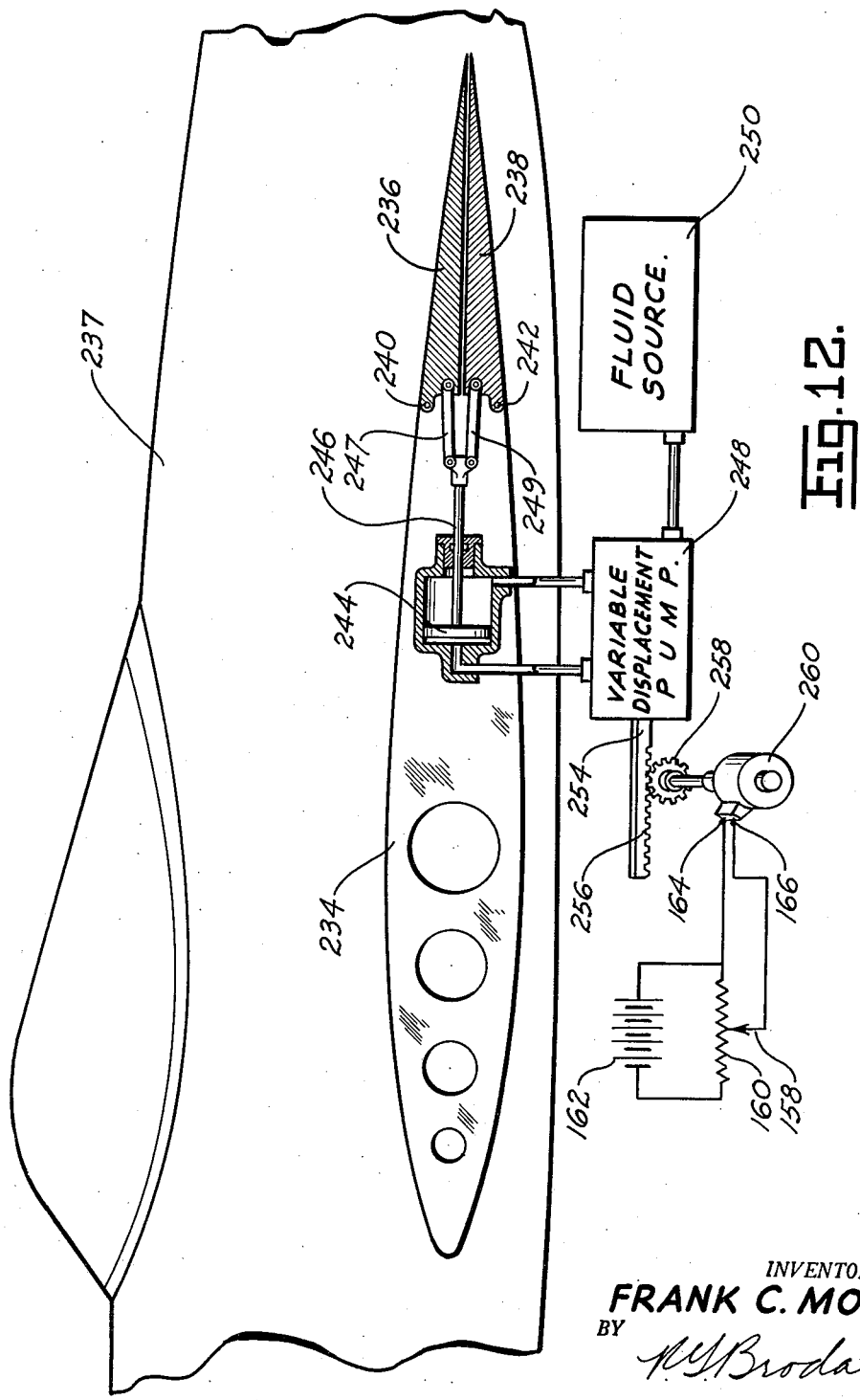

United States Patent Office 3,002,338
Patented Oct. 3, 1961

3,002,338
FUEL CONTROL APPARATUS
Frank C. Mock, South Bend, Ind., assignor to The Bendix Corporation, a corporation of Delaware
Filed Mar. 26, 1956, Ser. No. 574,030
2 Claims. (Cl. 60—35.6)

The present invention relates to control apparatus for an internal combustion engine and more particularly to fuel control apparatus for an internal combustion jet type of engine having at least one fuel combustion chamber, which engine is operative for propelling a vehicle such as an aircraft through a fluid medium such as air.

It is an object of the present invention to provide an improved control apparatus for controlling the operation of an internal combustion engine.

It is another object of the present invention to provide an improved fuel control apparatus for a gas turbine engine adapted for propelling an aircraft, which fuel control apparatus is operative to control the supply of fuel to said engine as a function of the propulsion speed of said aircraft.

It is a further object of the present invention to provide control apparatus for an internal combustion jet engine for propelling aircraft through the air, with the fuel control apparatus being operative to control the fuel supply to said engine as a function of the propulsion speed of said aircraft and/or the dynamic pressure of the air entering said engine.

It is a different object of the present invention to provide a gas turbine engine having a main combustion chamber and an afterburner combustion chamber, which control apparatus is operative to control the flow of fuel to the main combustion chamber to thereby limit the maximum temperature of the air entering the turbine unit, and in conjunction to control the supply of fuel to the afterburner combustion chamber as required to utilize the available oxygen resulting from any changes in the amount of fuel supplied to the main combustion chamber.

It is an additional object of the present invention to provide improved control apparatus for controlling the supply of fuel to an internal combustion engine as a function of the pressure of the air entering said engine to thereby limit the propulsion speed of the aircraft as a function of said pressure.

It is still another object of the present invention to provide control apparatus for an internal combustion jet engine for use in propelling a vehicle through a fluid medium, which control apparatus is operative to control the fuel supplied to the engine as a function of the temperature and/or the dynamic pressure of the fluid medium entering the engine.

It is a still further object of the present invention to provide an improved control apparatus for a gas turbine engine including a compressor unit, which control apparatus is operative to control the supply of fuel to the main combustion chamber of the engine as a function of the maximum allowable turbine temperature and to control the fuel supply to the afterburner combustion chamber as a function of the discharge pressure of the compressor unit modified by the propulsion speed of the aircraft and/or the mass of the fluid medium flowing through said engine to thereby utilize the available oxygen in the afterburner combustion chamber remaining after the combustion of the fuel in the main combustion chamber.

It is a still different object of the present invention to provide control apparatus for an internal combustion jet engine, which engine is adapted for the propulsion of a vehicle through a fluid medium, which control apparatus is operative to control the total amount of fuel supplied to said engine as a function of the propulsion speed of said vehicle to thereby maintain a desired maximum fuel air ratio, if desired, for all the air or oxygen flowing through the engine relative to the fuel supplied to the engine, and in addition for controlling a first portion of said total amount of fuel supplied to the engine which first portion is supplied to the main combustion chamber to thereby limit the turbine discharge temperature and for controlling the second and remaining portion of the total amount of fuel supplied to the engine which second portion is supplied to the afterburner combustion chamber such that combustion will take place in the afterburner combustion chamber with all of the available air or oxygen in that afterburner combustion chamber.

It is a still further object of the present invention to control the fuel supplied to the engine as a function of the propulsion speed of the vehicle to thereby maintain a desired or predetermined maximum fuel air ratio for the total amount of air or oxygen flowing through the engine, with a portion of that total amount of air being diverted or by-passed from the compressor and/or around the combustion chamber or chambers for the purpose of cooling the rearward part of the engine, such as for cooling the tailgate blades.

It is still an additional object of the present invention to provide an improved control apparatus for an internal combustion jet engine having an internal flow path for a fluid medium, which control apparatus is operative to control the supply of fuel to said engine as a function of a selected or predetermined temperature and/or a selected or predetermined pressure along said flow path for thereby controlling the supply of fuel to the engine as a function of said temperature and/or pressure.

Other objects and advantages will become apparent in view of the following description taken in conjunction with the drawings wherein:

FIGURE 2 is a schematic showing of the Mach number or propulsion speed control apparatus in accordance with the present invention;

FIGURE 4a is a curve chart illustrating the operation of a gas turbine engine at sea level altitude and more specifically illustrating the weight of air per minute in pounds which passes through the engine as a function of Mach number also the portion of that air burned respectively in the main burner, the afterburner, and substantially unburned in previous practice.

FIGURE 4b is a curve chart illustrating the operation of a gas turbine engine at an altitude of approximately 35,000 feet and more specifically illustrating the weight of air in pounds per minute as a function of Mach number;

FIGURE 4c is a curve chart illustrating the operation of a gas turbine engine at an altitude of approximately 60,000 feet and more specifically illustrates the weight of air in pounds per minute as a function of Mach number;

FIGURE 5 is a schematic showing of a prior art type of fuel control apparatus;

FIGURE 6 is a schematic illustration of fuel control apparatus in accordance with the present invention;

FIGURE 7 is a curve chart illustrating compressor discharge pressure as a function of bellows control pressure, which latter control pressure is utilized to control the bellows member shown in FIGURE 7;

FIGURE 12 is a schematic illustration of a suitable fluid flow resistance member which can be utilized in accordance with the present invention to control the propulsion speed of the vehicle;

FIGURE 14 is a still further modification of the Mach control apparatus in accordance with the present invention.

Figure 1:
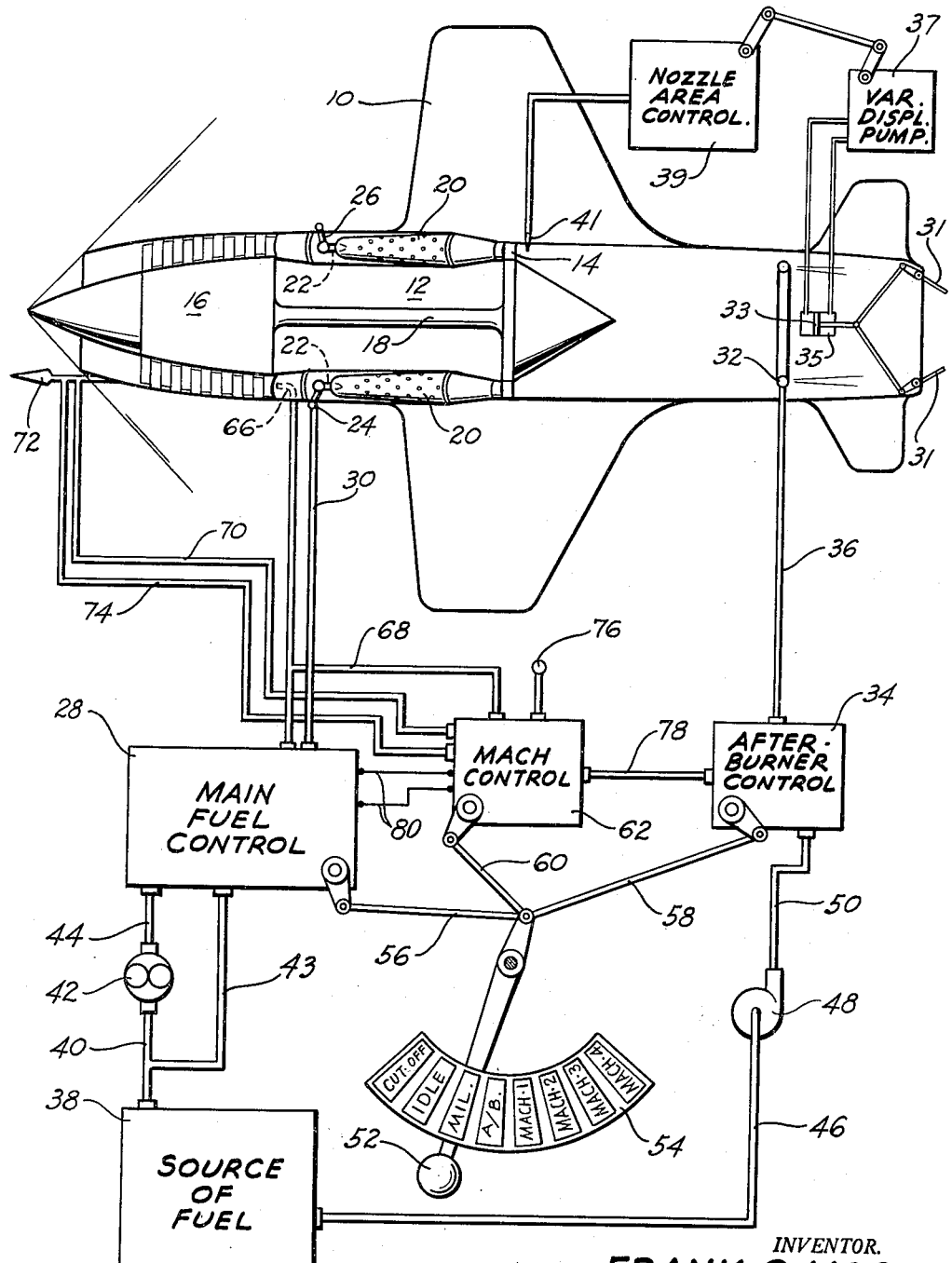
FIGURE 1 is a schematic showing of a vehicle including a gas turbine engine and control apparatus in accordance with the present invention.

Referring to FIGURE 1 there is shown an aircraft 10 including a gas turbine engine 12 which engine includes a turbine unit 14 and a compressor 16 which turbine unit and compressor are interconnected by a drive shaft 18. The gas turbine engine includes a plurality of main combustion chambers 20 with each of said combustion chambers or cans including fuel nozzles 22 which are supplied fuel from a fuel manifold 24 through individual fuel conduits 26. Fuel is supplied to the manifold 24 from the main fuel control 28 through an outlet fuel conduit 30. An afterburner fuel manifold 32 is shown and is supplied afterburner fuel from an afterburner fuel control 34 through a fuel conduit 36. Fuel is supplied from a suitable source of fuel 38 through a first fuel conduit 40 to the main fuel pump 42 from which it is supplied to the main fuel control 28 through a fuel conduit 44. The main fuel pump 42 is by-passed by the conduit 43 in the conventional manner. In a like manner fuel is supplied from the fuel source 38 through a conduit 46 to an afterburner fuel pump 48 and then to the afterburner control 34 through a fuel conduit 50.

A manual control throttle member 52 is operatvie with a control quadrant 54 to control the operation of the main fuel control 28 through a connecting arm 56 and to control the operation of the afterburner control 34 through a connecting arm 58. A third connecting arm 60 leads to control the operation of a Mach number control 62. The afterburner control 34 is responsive to the discharge pressure of the compressor unit 16 through a pressure sensing device 66 which is connected to the afterburner control 34 through a conduit 68. The Mach control 62 is responsive to the total or ram impact pressure of the fluid medium through which the aircraft 10 is moving through a conduit 70 connected to a Mach number or flight speed sensing device 72. The latter device 72 also senses and is responsive to cone static pressure and for this purpose is connected to the Mach control 62 through conduit 74. The propulsion speed sensing device 72 is designed to have a substantially 30° included angle, as shown. The Mach control is also responsive to ambient static pressure through an ambient static pressure sensing device 76. The Mach control 62 is operative to control the operation of the afterburner control 34 through the control connection 78. The Mach control 62 is operative to control the operation of the main fuel control 28 through the electrical control connection 80.

The gas turbine engine 12 shown in FIGURE 1 may include a variable area exhaust nozzle, with variable position tailgates 31 being provided for this purpose, and being controlled in position by a suitable control piston 33. The latter control piston is operative within a cylinder 35 to which control fluid is supplied from a variable displacement pump 37, with the latter pump 37 being controlled by a suitable nozzle area control device 39 in response to a temperature sensing element or member 41. The operation of the variable area exhaust nozzle may be in accordance with the teachings of copending patent application Serial No. 568,630, filed February 29, 1956, by Howard J. Williams and James E. Hurtle and assigned to the same assignee as the present application, now Patent No. 2,987,876.

In FIGURE 2 there is shown the Mach number or flight speed sensing device 72 which is responsive to both the free stream impact or ram pressure and the cone or angular static pressure. The ambient static pressure sensing device 76 is provided which senses the ambient pressure adjacent the aircraft where the fluid pressure is roughly proportional to and slightly less than that around the Mach number or flight speed sensing device 72. The control apparatus shown in FIGURE 2 includes an aircraft flight speed or Mach number compensator 96 which is operative to bleed off or vary the fluid pressure within the fuel control bellows chamber 98 to a predetermined ratio at all flight speeds below Mach 1.0 or the speed of sound; and then to decrease the bleed off as the flight speed or the Mach number increases above Mach 1.0 or the speed of sound. This bleed off or pressure variance is regulated by a fixed orifice 100 positioned within the line 68 leading from the compressor discharge pressure sensing device 66 as shown in FIGURE 1. The Mach number compensator 96 includes a control valve 106 which controls the bleed off or fluid flow from the fluid chamber 105 to the ambient static pressure conduit 108. As the Mach number or vehicle speed increases, the control valve 106 moves to the left as shown in FIGURE 2, as accomplished by movement of the diaphragm 110. High ram pressure is admitted from the propulsion speed sensing device 72 through conduit 90 and then through the damping orifice 112 to the fluid chamber 114. The lower value angular static pressure from the propulsion speed sensing device 72 is admitted to the fluid chamber 116 through conduit 117 including the damping orifice 118. A third fluid chamber 120 is provided between the fluid chambers 114 and 116 and contains fluid at a lower pressure than either of the latter chambers in order that the diaphragm 110 and the diaphragm 122 may be in mutual stress against each other. The third fluid chamber 120 is connected to the ambient static pressure conduit 108 through conduit 121. A second control valve 124 is provided to equalize or balance the pressures within the fluid chambers 114 and 116. As the propulsion speed of the vehicle or the Mach number increases the valve 124 is opened with the result that the fluid pressure within fluid chamber 114 does not tend to increase relative to the fluid pressure within the fluid chamber 116. In this respect the travel of the control valve 124 as well as the travel of the control valve 106 is a function of flight speed or Mach number and by proper calibration and profiling of the respective control valves 106 and 124, any desired bleed off or pressure variation of the fluid pressure within the fluid control chamber 98 can be obtained relative to the flight speed or Mach number.

In FIGURE 2 there is also shown a Mach number selector or control apparatus 130 which is operative to control or limit the supply of fuel to the afterburner and/or main combustion chambers as a function of the desired or selected vehicle propulsion speed or Mach number. The selection of the propulsion or aircraft flight speed or Mach number is determined by the manual control throttle 52. The fuel supplied to the particular combustion chamber for example the afterburner combustion chamber is controlled by varying the fluid pressure within the chamber 98 through the valve seat 102 by means of the control valve 134. The position of the latter control valve 134 is determined by a multiple bellows arrangement comprising an outer bellows member 136 and an inner bellows member 138, with a suitable vacuum provided between them. The outer bellows member 136 is exposed to the ambient static pressure as sensed by the sensing unit 76 and supplied to the fluid chamber 140.

The inner bellows member 138 is responsive to ram pressure as sensed by the speed sensing device 72 and passing through the conduit 141 including the fixed control orifice 142 and modified by the action of the needle valve member 145 as a function of angular static pressure as passed through the conduit 139. The two bellows members 136 and 138 are anchored on their left end as shown in FIGURE 2 and mutually connected on their right end to the control lever 144 which controls the position of the control valve 134. At some ratio of ram pressure over the angular static pressure the control valve 134 will close. This ratio may be varied by changing the position of the needle valve 145 by means of a cam 146 operated by the control throttle member 52. The needle valve member 145 by changing its position against the action of the compression spring member 148 determines the ratio of ram pressure over angular static pressure at which the control valve member 134 is closed. As the needle valve member 145 is moved away from its seat to decrease the control pressure sensed by the inner bellows member 138, the effective ratio of ram pressure over angular static pressure which will result in the closing of the control valve member 134 is raised such that a higher vehicle speed or Mach number will result.

To safely limit the ram pressure which the aircraft will encounter, irrespective of pilot's throttle selection, the total pressure limiter 152 is provided. The total pressure limiter 152 comprises a bellows member which is responsive to the total or ram pressure within the fluid chamber 153 as sensed by the device 72 and conduits 70 and 141 to thereby control the position of the needle valve member 145 through the bell crank 154 which is connected to the output of the Mach limiter bellows 152 such that as both the air speed and the density of the fluid medium through which the vehicle is being propelled increase, the fluid pressure within the fluid chamber 153 thereby also increases, to tend to overcome the spring 155 and to close the needle valve member 145 to thereby open the control valve member 134 to reduce the afterburner fuel flow and if needed to operate the rheostat 160 to cut down the main fuel flow and/or to open the dive flaps 236 and 238, as shown in FIGURE 12. Sealing bellows 156 is secured to bell crank 154 and the housing of limiter 152 to totally close chamber 153 yet permit movement of bell crank 154.

The control lever 144 which is connected to control the position of the control valve member 134 is also connected to control the position of movable contact arm 158 of the potentiometer resistor or rheostat 160. The latter potentiometer resistor 160 is connected across a suitable source of energy 162. A pair of contacts or terminals 164 and 166 are connected to be responsive to the position or output of the variable contact arm 158 to thereby furnish a control potential which is a function of vehicle flight speed or Mach number.

The fluid chamber 98 includes a fluid pressure responsive control bellows member 99 connected to a control arm or a control valve member 101 suitable for controlling the supply of afterburner fuel to the afterburner combustion chamber as shown in FIGURE 6.

Figure 3:
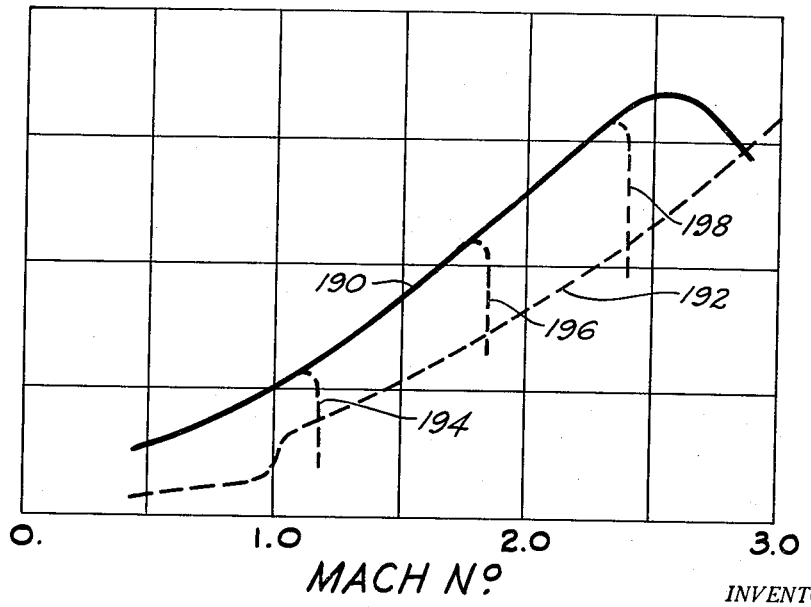
FIGURE 3 is a curve chart illustrating the thrust of the engine as a function of Mach number and the drag or fluid flow resistance of the vehicle as a function of Mach number.

In FIGURE 3 there is shown a curve chart which illustrates practical aircraft thrust and drag relationships that are obtainable with present known techniques for reducing aircraft drag combined with known improvements which can be made to present propulsion engines, such that when the available thrust is greater than the effective aircraft drag around Mach 1.0. The thrust curve may run above and approximately parallel to the drag curve of the aircraft through a considerable range of speeds above Mach 1.0. Since present controls tend to hold the same engine speed and afterburner fuel/air ratio above Mach 1.0, FIGURE 3 illustrates the need for control apparatus operative as a function of aircraft flight speed or Mach number. In FIGURE 3 the curve 190 represents the full throttle thrust obtainable for aircraft propulsion 192 represents a corresponding aircraft drag which is practically obtainable with present day design techniques. Curves 194, 196 and 198 illustrate respective Mach number or aircraft flight speeds obtainable by adjusting the position of the control throttle member 52 shown in FIGURE 2.

In FIGURES 4a, 4b and 4c there are shown curve charts which respectively illustrate the relative weight of air received by the engine at different speeds and altitudes and also the weight of air burned in the respective sections of a gas turbine engine for the various altitudes. In FIGURE 4a there are shown the weights of air received and burned in respectively the main combustor and the afterburner combustion chambers at sea level altitude. The curve 200 represents the weight of air burned in the main combustion chamber as a function of propulsion speed or Mach number. The difference between curve 200 and curve 202 represents the weight of air burned in the afterburner combustion chamber at a constant mass ratio of fuel to air going through the turbine, as is presently the general practice, and the difference between curve 202 and 204 represents the weight of air which is presently unburned by the gas turbine engine. FIGURE 4b illustrates the same values for an aircraft gas turbine engine operating at an altitude of 35,000 feet, and FIGURE 4c illustrates the same values for an aircraft gas turbine engine operating at an altitude of 60,000 feet. The curves shown in FIGURES 4a, 4b and 4c illustrate the need for the Mach number compensator unit 96 shown in FIGURE 2.

As flight speed or Mach number of the aircraft increases, the inlet temperature of the fluid medium entering the engine as a result of the ram effect increases such that in order to hold a constant maximum limiting gas temperature at the inlet to the turbine blades, it may be necessary to decrease the fuel air ratio in the main combustion chamber as a function of Mach number. This may result in an increasing percentage of unburned air or oxygen going to the afterburner combustion chamber as the flight speed goes above Mach 1.0. It is the present practice to control the supply of fuel to the afterburner combustion chamber to hold a substantially constant ratio of afterburner fuel flow relative to main combustion chamber fuel flow, and therefore a substantial increase in thrust may be obtained by increasing the ratio of afterburner fuel supplied to the afterburner combustion chamber relative to the air flow through the engine as a function of flight speed or Mach number. This is the intended function of the Mach number compensator unit 96 shown in FIGURE 2.

In FIGURE 5 there is shown a schematic illustration of a prior art type of fuel control valve for controlling the supply of afterburner fuel. In the fuel control apparatus of FIGURE 5 a control bellows member 99 is connected to a control needle valve member 101 such that in response to a fluid pressure such as compressor discharge pressure applied to the fluid chamber 98, the evacuated bellows member 99 working in conjunction with the provided compression spring member 103 will result in the positioning of the needle valve member 101 to control the flow of fuel from the inlet fuel conduit 50 to the outlet fuel conduit 36. In this respect it is to be understood that the fuel control apparatus shown in FIGURE 5 also includes fuel pressure regulation apparatus (not shown) for maintaining a substantially constant fuel pressure head or differential across the valve member 101 or in other words between the fuel conduits 36 and 50. Also, a control throttle valve (not shown) should be provided between fuel conduits 36 and 50, and operatively connected to the throttle connecting arm 58 shown in FIGURE 1.

In FIGURE 6 there is shown a schematic illustration of fuel control apparatus in accordance with the present invention wherein the fluid chamber 98 receives compressor discharge pressure through the fluid conduit 68 and fixed control orifice 100, but there is in addition provided a Mach control 62 which bleeds off through the fluid conduit 78 some of the fluid pressure within the fluid chamber 98 such that the positioning of the control needle valve 101 may be varied as the function of flight speed or Mach number. Also, note the modified shape given in FIGURE 6 to the needle valve member 101, as compared to the showing of FIGURE 5.

In FIGURE 7 there is shown a curve chart illustrating the operation of the control valve shown in FIGURE 6 as compared to the fuel control valve shown in FIGURE 5. In this respect the fuel control valve shown in FIGURE 6 includes a larger area orifice opening as provided by the needle control valve 101, such that in the apparatus shown in FIGURE 6 a given movement of the needle control valve 101 will result in a greater flow of fuel between the inlet fuel conduit 50 and the outlet fuel conduit 36 as compared to the apparatus shown in FIGURE 5. In this respect and referring to the curve chart shown in FIGURE 7 the curve 210 represents the operative functioning of the modified control apparatus shown in FIGURE 6. The curve 214 illustrates the operation of the prior fuel control apparatus as shown in FIGURE 5. For a compressor discharge pressure X the prior fuel control apparatus would result in a control pressure for bellows member 99 as illustrated by the position B. The new control apparatus shown in FIGURE 6 for this same compressor discharge pressure X would result in a bellows control pressure of A. However, the fuel flow path orifice opening as determined by the needle valve member 101 for the fuel control apparatus shown in FIGURE 5 as compared to the fuel flow orifice opening in FIGURE 6 would be such that the same amount of fuel would flow to the afterburner combustion chamber for the bellows control pressure B for the FIGURE 5 apparatus as would flow for a bellows control pressure A for the FIGURE 6 apparatus. However the FIGURE 6 apparatus compensates for increased flight speed as shown by curve 212 such that as flight speed goes up the compressor discharge pressure $P_c$ increases with flight speed of Mach number such that for an increased flight speed the compressor discharge pressure may be corresponding to the pressure Y shown in FIGURE 7. For this new and higher pressure Y, the control apparatus of FIGURE 5 would receive a bellows control pressure D. In the control apparatus of FIGURE 6 without the Mach control 62 and the fuel conduit 78 for bleeding or decreasing the fluid pressure within the fluid chamber 98 there would result a bellows control pressure C. However, due to the operation of the Mach control 62 and the connecting fluid conduit 78 there results due to the flight speed or Mach number of the aircraft a modification of the fluid pressure within the fluid chamber 98 such that the bellows control pressure within the fluid chamber 98 increases to the position E shown in FIGURE 7 and as determined by the curve 212 to thereby increase the flow of afterburner fuel from the inlet fuel conduit 50 to the outlet fuel conduit 36 in accordance with the higher bellows control pressure E as necessary for combustion with the resulting increase in the amount of air or oxygen available for combustion in the afterburner chamber, as previously explained.

Figure 8:
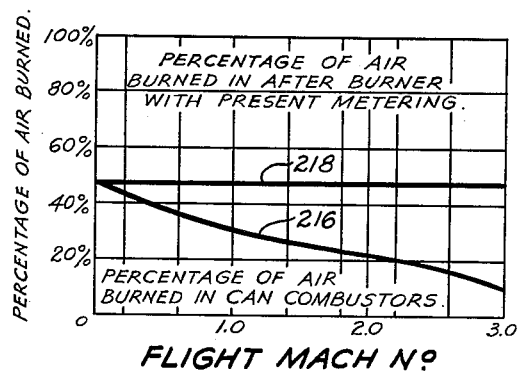
FIGURE 8 is a curve chart illustrating the percentage of air or oxygen burned in respectively the main combustion chamber and the afterburner combustion chamber of a gas turbine engine as a function of vehicle speed or Mach number.

In FIGURE 8 there is shown a curve chart illustrating the relationship between the percentage of air burned in each of the main or can combustion chambers and the afterburner combustion chamber as a function of flight speed or Mach number. The curves shown in FIGURE 8 particularly illustrate the fuel control requirement due to the increase in the inlet temperature of the fluid medium entering the engine as a result of the ram effect due to the propulsion speed of the aircraft. In FIGURE 8 the curve 216 illustrates the percentage of air burned in the main combustion chamber as a function of Mach number. The percentage of air burned in the afterburner with present metering methods is illustrated by the percentage above the curve or line 218. The percentage difference between the curve 216 and the curve 218 represents that percentage of air which is available as a function of vehicle speed or Mach number for burning in the afterburner by increasing the fuel supplied to the afterburner in accordance with the present invention for combustion with this otherwise unburned air. However, it should be here noted that a part of the air may have to be diverted to assist in cooling the tailpipe, since this increased afterburner fuel feed will be reflected in higher flame and tailpipe temperatures.

Figure 9:
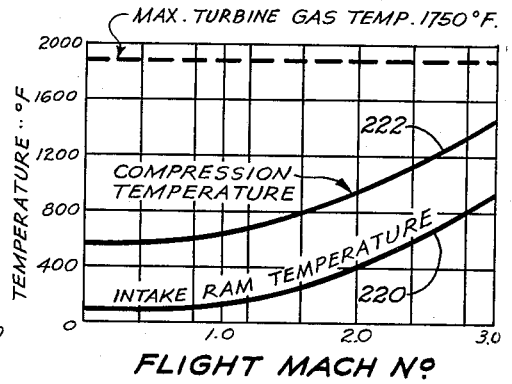
FIGURE 9 is a curve chart showing compressor inlet ram temperature as a function of Mach number and compressor outlet temperature as a function of Mach number.

In FIGURE 9 there is shown a curve chart which illustrates the effect of ram temperature rise upon the compression temperature. The curve 220 illustrates the intake ram temperature at the inlet of the engine as a function of flight speed or Mach number. The curve 222 illustrates the temperature at the outlet of the compressor as a function of flight speed or Mach number. The permissible fuel/air ratio in the main engine will be proportional to the temperature rise or difference between the line 222 and the 1750° F. maximum limit. This is the reason for the drop of the line 216 of FIGURE 8.

Figure 10:
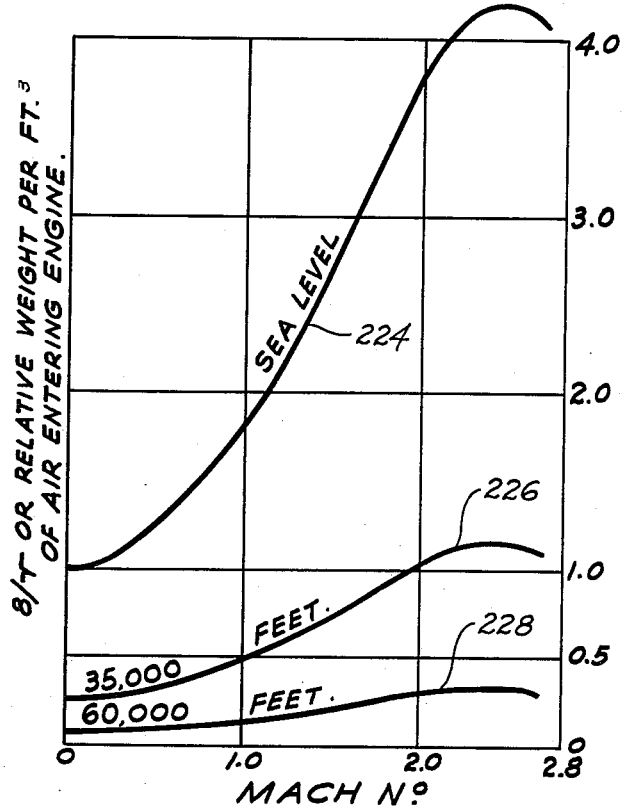
FIGURE 10 is a curve chart illustrating the relative weight of air per cubic feet entering the engine as a function of Mach number for respectively sea level altitude, 35,000 feet altitude and 60,000 feet altitude.

In FIGURE 10 there is shown a curve chart illustrating the relative weight in pounds per cubic feet of the air entering the engine as a function of flight speed or Mach number for respectively sea level operation, for 35,000 feet altitude operation and for 60,000 feet altitude operation. The droop at the curves at the higher Mach numbers is because of the lower pressure recovery due to shock losses at the air inlet.

Figure 11:
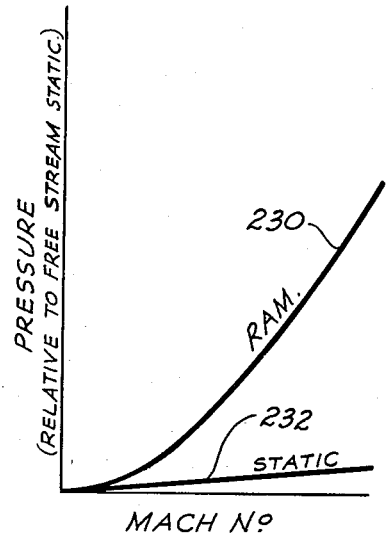
FIGURE 11 is a curve chart illustrating the dynamic pressure on the vehicle as a function of Mach number.

In FIGURE 11 there is shown a curve chart illustrating a typical variation of ram pressure and cone static pressure with Mach number. The curve 230 shown in FIGURE 11 illustrates the change in ram pressure as sensed by the vehicle speed sensing device 72 shown in FIGURE 2 as a function of flight speed or Mach number. The curve 232 illustrates the cone or angular static pressure change as a function of Mach number or flight speed which cone static pressure is sensed by the vehicle speed sensing device 72 shown in FIGURE 2.

In FIGURE 12 there is shown a schematic drawing of an aircraft velocity decreasing apparatus which is suitable for incorporation as part of the wing 234 of an aircraft 237. This apparatus includes a pair of separable wing sections 236 and 238, with the first section 236 being pivoted about support 240 and the second section 238 being pivoted about support 242. A control piston member 244 is provided and connected through an arm 246 to either pull or push the links 247 and 249 which are pivotally connected as shown between the arm 246 and the respective wing sections 236 and 238 to pivot the respective first section 236 and second section 238 away from each other such that the drag or resistance to air flow around the wing 234 is thereby increased and hence the flight speed of the aircraft 237 is thereby decreased. By the same token when the arm 246 is pulling on the links 247 and 249 the wing sctions 236 and 238 are held together to prevent flutter and like movement. A variable displacement pump 248 is supplied control fluid from a suitable source 250. The variable displacement pump 248 may be of the same type shown and described in copending patent application Serial No. 568,630, filed February 29, 1956, by J. E. Hurtle and H. J. Williams and assigned to the same assignee as the present invention, now Patent No. 2,987,876. The variable displacement pump 248 is provided with a control member 254 connected through a suitable rack and pinion 256 and 258 for operation by means of a power source such as reversible electric motor 260. The electric motor 260 may be connected between the terminals 164 and 166 shown in FIGURE 2 such that the potential supplied from across the potentiometer 160 and adjusted by the position of the variable tap 158 is utilized to energize the motor 260 to control the variable displacement pump 248 to move the piston 244 either to the left or to the right as required such that the respective positions and relative positions and relative separation of the first wing section 236 and second wing section 238 can be thereby determined to control the flight speed of the aircraft in this manner.

Figure 13:
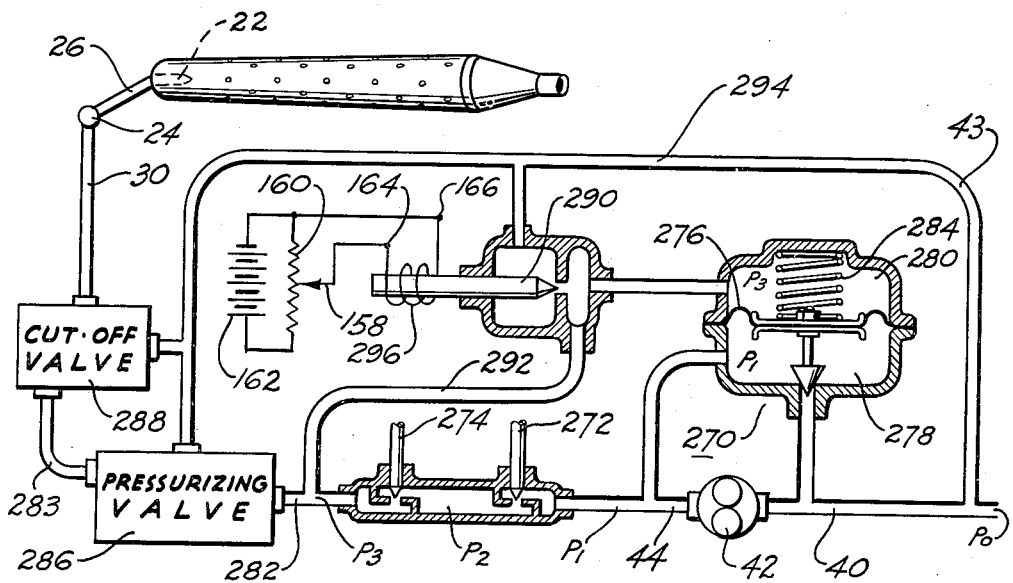
FIGURE 13 is a schematic diagram of main fuel control apparatus in accordance with the present invention.

In FIGURE 13 there is shown a schematic illustration of main fuel control apparatus in accordance with the present invention. In FIGURE 13 there is shown the main fuel pump 42 connected between an inlet fuel conduit 40 and outlet fuel conduit 44. A by-pass valve unit 270 is connected to by-pass fuel from the fuel conduit 44 to the inlet fuel conduit 40. A conventional regulator valve 272 and fuel metering valve 274 are schematically illustrated, these latter valves 272 and 274 may be controlled by various engine operational parameters such as speed, compressor discharge pressure and the like. The by-pass valve includes a diaphragm 276 which is positioned between a first chamber 278 receiving fuel at pump outlet pressure $P_1$ within the outlet fuel conduit 44 and a second chamber 280 receiving fuel pressure $P_3$ within fuel conduit 282 such that said diaphragm is responsive to the $P_1-P_2$ pressure difference. A compression spring 284 is included within the fuel chamber 280 and is operative to set up a fuel flow control head between the fuel conduit 44 and the fuel conduit 282. The fuel conduit 282 supplies fuel through the conventional pressurizing valve 286, and the fuel conduit 283 to the cut-off valve 288 and then to the fuel nozzle 22 through the fuel manifold 24 and the connecting fuel conduits 26 and 30. A Mach number main fuel control valve 290 is connected between the fluid conduit 292 leading between the second fluid chamber 280 and the fuel conduit 282 and a fuel conduit 294 which is connected to the inlet fuel conduit 40 through the fuel conduit 41. The opening or control orifice area of the control valve 290 is determined by a relay control apparatus 296 connected between the terminals 166 and 164 shown in FIGURE 2. The potentiometer 160 is supplied energy from a power source 162 and includes an adjustable contact 158 as shown in FIGURE 2. It should be understood that the control valve 290 may have its control orifice area varied by a reversible electric motor or the like, if desired.

In FIGURE 14 there is shown a further modification of the apparatus shown in FIGURE 2. In FIGURE 14 there is shown a vehicle propulsion speed sensing or responsive device 72. With control fluid at ram temperature and pressure being supplied through a fluid conduit 300 to a fluid chamber 302 in which there is positioned a ram temperature responsive bimetal element 304. A small escape vent 305 to duct 76 permits hot gas circulation. A control throttle member 52 is operative to position the control cam 146 which determines the position of the bimetal element 304 about pivot support point 310. The end of the bimetal control element 304 is fixedly connected to support member 312, which support member 312 is pivotally supported about support connection 310, such that angular movement of the control cam 146 about the pivot connection 308 results in a control movement of the bimetal control element 304. The end support member 312 extends to control the position of a control valve member 134 relative to a valve seat 102 such that the bimetallic control element 304 deflects or bends in response to the ram temperature as sensed by the fluid chamber 302 to thereby control the position of the control valve member 134 to in turn control the fluid pressure within the fluid conduit 97. The bimetal element 304, when relatively cold, deflects such that its free end moves in a direction below the plane including valve member 134 and pivot support 310. When heated the bimetal element deflects such that its free end moves in a direction above this plane. The valve member 134 is normally held seated by spring member 311. The fluid conduit 68 is connected to a compressor discharge pressure sensing member 66 as shown in FIGURE 1. The fluid conduit 78 leads to the fluid chamber 98 as shown in FIGURE 2. The angular static pressure outlet of the vehicle speed sensing device 72 is connected through fluid conduit 316 to fluid chamber 318 including bellows member 152 such that the latter bellows member 152 acting through control lever 319 and extension arm 321 is operative to deflect the bimetal control element 304 in response to the density and/or angular static pressure of the fluid medium at the altitude at which the aircraft or vehicle is being propelled.

Mach number compensation for the afterburner fuel supply in response to ram temperature is provided by a second bimetal control element 320 which is responsive to the temperature of the fluid medium within the fluid chamber 322 as supplied through the fluid conduit 324 from the vehicle speed sensing device 72. An outlet fluid conduit 325 is provided for fluid chamber 322 to permit fluid circulation within said fluid chamber 322. The second bimetal control element 320 is fixedly connected at one end to support member 326. The other end is operative to control the position of a control valve 106 which in turn varies the fluid pressure within the fluid conduit 97 as explained previously relative to the control apparatus of FIGURE 2.

In general, the thrust of a gas turbine jet engine or ram jet engine with afterburner stoichiometric combustion may be conveniently assumed to vary with the ram or total inlet pressure and inversely as the square root of the total temperature of the air at the inlet. Any engine capable of 60,000 feet altitude operation has a very great excess of thrust over drag at sea level as shown in FIGURE 4, but the flight forces are so great that some sort of flight speed or Mach number limiter is required for low altitude operation. In this respect, operation without the afterburner is practical at sea level altitude. At medium altitude and once the engine thrust is adequate to overcome the drag hump around flight speed of Mach 1.0, with proper design a superiority of thrust over drag may be maintained through a wide range of flight speed and will not start to fall off appreciably until the ram pressure recovery ratio drops off at a flight speed of around Mach 3.0.

In the operation of the apparatus shown in FIGURES 1 and 2, the control of afterburner fuel by the afterburner control 34 and the control of the main combustion chamber fuel as supplied to the nozzles 22 by the main fuel control 28 is based in part upon flight speed or Mach number. As the flight speed increases such that the temperature of the turbine blades approaches the maximum limiting temperature as more particularly shown in FIGURE 9, it becomes necessary that the fuel supplied to the main combustion chamber 20 by the main fuel control 28 be decreased to so limit the turbine temperature with the result that the amount of unburned air or oxygen available for combustion with fuel from the afterburner manifold 32 increases. Therefore in order to obtain maximum thrust by burning all of the available air or oxygen and thereby to maintain substantially stoichiometric fuel air ratios throughout the engine, except for compressor air diverted for cooling of the tailpipe as may be desirable, it becomes necessary to increase the supply of fuel to the afterburner manifold 32 by the afterburner control 34 to compensate for this decrease in fuel necessitated by the maximum limiting temperature at the blades of the turbine unit 14. This is accomplished by the control apparatus 96 shown in FIGURE 2. The diaphragm 110 and the diaphragm 122 are responsive to the ratio of the ram pressure over the angular static pressure, and since the ram pressure increases more rapidly as shown by the curve chart of FIGURE 11 this results in an increase in the fuel supplied by the afterburner control 34 such that an increased percentage of the total fuel supplied to the engine is supplied by the afterburner control 34 as the propulsion speed increases. The control apparatus 130 shown in FIGURE 2 is operative to control or limit the supply of afterburner fuel as a function of desired flight speed or Mach number as scheduled by the control throttle 52. The valve member 134 is normally seated, and is opened when the propulsion speed of the vehicle exceeds the speed scheduled by the throttle member 52. The bellows 152 is operative, regardless of the pilot's manipulation of the throttle 52, to limit the supply of fuel to the engine by the afterburner control 34 by opening the valve member 134 as explained above, and/or to limit the supply of fuel to the engine by the main fuel control 28 to thereby limit the flight speed of the aircraft to a safe value dependent upon the density of the fluid medium through which the aircraft is being propelled. In other words, at lower altitudes the air is more dense and hence the flight speed of the aircraft must be decreased to avoid prohibitive and destructive strain on the vehicle or airplane structure. In that the fuel flow to the engine may be not solely determinative of the actual operative speed of the aircraft, for example in a dive operation, the flight or propulsion resistance apparatus shown in FIGURE 12 has been incorporated as a part of the present invention to successively further decrease the operative speed of the aircraft relative to the fluid medium through which it is flying in response to the control apparatus 130 and in response to the movement of the control arm 144 as shown in FIGURE 2.

Relative to the physical positioning of the Mach number or propulsion speed sensor device 72, it should be positioned ahead or in front of the aircraft a sufficient distance to be little or the least disturbed by the shock waves due to the vehicle 10, as shown in FIGURE 1.

Referring to FIGURE 14, the throttle member 52 is shown in the lower propulsion speed setting position in solid lines, and by dotted lines the throttle member 52 is shown in its higher propulsion speed setting position. The main fuel control 28 shown in FIGURE 1 may be operative in accordance with the general teachings of copending application Serial No. 499,432, filed April 5, 1955, by H. J. Williams, F. R. Rogers and B. J. Ryder and assigned to the same assignee as the present application. The afterburner fuel control 34 shown in FIGURE 1 may be operative in accordance with the general teachings of copending application Serial No. 555,882, filed December 28, 1955, by T. B. Card, F. R. Rogers and R. R. Riggs and assigned to the same assignee as the present application, now abandoned.

It should be further understood that the main control 28 in practice tends to maintain a substantially constant turbine inlet temperature, such that the mass or weight of the air flow through the turbine approaches a direct linear function of the turbine inlet absolute pressure, so long as the air flow is sonic.

Several embodiments of the present invention have been schematically illustrated and described, however it will be apparent to those skilled in this art that various changes in the structure and relative arrangement of parts may be made to suit individual requirements without departing from the scope and spirit of the present invention.

I claim:
1. In fuel control apparatus for a gas turbine engine, said engine including a main combustion chamber and an afterburner combustion chamber and being connected to a vehicle for propelling said vehicle through a fluid medium, said engine being provided with a source of fuel, the combination of a main fuel control for controlling the supply of fuel from said source to said main combustion chamber, an afterburner fuel control responsive to an engine operating air pressure for controlling the supply of fuel from said source to said afterburner combustion chamber, means for sensing two pressures whose difference is indicative of vehicle propulsion speed, means for selecting a desired vehicle propulsion speed, and control means connected to the last two named means for producing an error signal representative of the difference between actual and desired vehicle propulsion speed, said control means being connected to said main and said afterburner fuel controls to modify the fuel supplied thereby and control the vehicle to a desired propulsion speed.

2. In fuel control apparatus for a gas turbine engine, said engine including an afterburner combustion chamber and being connected to a vehicle for propelling said vehicle through a fluid medium, said engine being provided with a source of fuel, the combination of an afterburner fuel control for controlling the supply of fuel from said source to said afterburner combustion chamber respectively, a sensing device for sensing two air pressures whose difference is a measure of vehicle propulsion speed, throttle means for selecting a desired vehicle propulsion speed, a flight speed compensator device connected to said sensing means and said afterburner control to cause an increase in fuel supplied to said combustion chamber with an increase in vehicle propulsion speed, a flight speed selector device connected to said sensing means and said afterburner control to cause a decrease in fuel supplied to said combustion chamber with an increase in vehicle propulsion speed during a preselected range of vehicle propulsion speed, said flight speed selector connected to said throttle means for altering the preselected range of operation, and means responsive to total ram pressure connected to said throttle means for limiting the maximum preselected range of vehicle propulsion speeds in response to ram pressure.

References Cited in the file of this patent
UNITED STATES PATENTS

| | | |
|---|---|---|
| 2,512,790 | Cleveland | June 27, 1950 |
| 2,671,620 | Andrews | Mar. 9, 1954 |
| 2,700,275 | Chandler et al. | Jan. 25, 1955 |
| 2,740,255 | Machlanski | Apr. 3, 1956 |
| 2,761,278 | Jonas et al. | Sept. 4, 1956 |
| 2,765,619 | Peterson | Oct. 9, 1956 |
| 2,789,417 | Kuzmitz | Apr. 23, 1957 |
| 2,850,871 | Drake | Sept. 9, 1958 |
| 2,851,230 | Greenland | Sept. 9, 1958 |
| 2,895,692 | Leduc | July 21, 1959 |